Patented Aug. 7, 1945

2,381,000

UNITED STATES PATENT OFFICE 2,381,000

HALOGENATED ORGANOSILICON COMPOUNDS

Winton I. Patnode, Schenectady, N. Y., and Robert W. Schiessler, State College, Pa., assignors to General Electric Company, a corporation of New York No Drawing. Application March 4, 1942, Serial No. 433,328

8 Claims. (Cl. 260—607)

The present invention relates to novel halogenated organosilicon compounds and to a process for preparing such compounds. It is particularly concerned with halogenated organosilicon compounds having the formula $X_3Si(CH_2)_nSiX_2Y$ wherein X represents a halogen atom, Y represents a hydrogen atom or a halogen atom of the same type as that represented by X, and $n$ is an integer equal to or greater than 1.

Organosilicon compounds of the type represented by the formula $R_4Si$, wherein R is a saturated hydrocarbon radical such as a methyl, phenyl, etc. radical, have been known for many years. Organosilicon compounds of the type represented by the formula $R_aSi(X)_{4-a}$, wherein R is a saturated hydrocarbon radical, X is a halogen atom and $a$ is an integer from 1 to 3 are also known. Similarly, compounds of the latter type in which one or more of the hydrocarbon radicals are replaced by hydrogen are known.

In addition to these simple organosilicon compounds which contain but one atom of silicon, more complex compounds containing more than one atom of silicon are also known. However, in these known compounds, the atoms of silicon are either linked directly to each other, as for example in hexachlorodisilane $Cl_3Si-SiCl_3$, or are linked by oxygen, as for example in the compounds obtained by hydrolysis of chlorosilanes. Compounds of the latter type are described for example in Patent 2,258,218 issued to Eugene G. Rochow.

The present invention relates to a new class of halogenated organosilicon compounds in which the atoms of silicon are linked to each other by carbon atoms. Examples of such compounds containing two silicon atoms linked by one or more carbon atoms, i. e., compounds having the type formula $X_3Si(CH_2)_nSiX_2Y$, wherein X represents a halogen atom, particularly a chlorine atom, Y is an atom selected from the group consisting of hydrogen and the same halogen atom as that represented by X, and $n$ is a whole number equal to at least 1 and not more than 4, preferably not more than 2, are the following:

Trichlorosilyldichlorosilylmethane,
 $Cl_3SiCH_2SiCl_2H$
Bis(trichlorosilyl)methane, $Cl_3SiCH_2SiCl_3$
1,2-bis(trichlorosilyl)ethane, $Cl_3SiCH_2CH_2SiCl_3$
Trichlorosilyldichlorosilylbutane,
 $Cl_3Si(CH_2)_4SiCl_2H$ Compounds of the above type are prepared in accordance with our invention by effecting reaction between a symmetrical hydrocarbon dihalide such as methylene chloride, ethylene chloride, etc., and silicon at elevated temperatures in the presence of a metallic catalyst, particularly a copper catalyst.

The silicon reactant may be used in granular or powdered form intimately associated with finely-divided copper catalyst. Such mixtures are more fully described in connection with the preparation of organosilicon halides containing one silicon atom per molecule in the copending application of Eugene G. Rochow, Serial No. 412,459, filed September 26, 1941, and assigned to the same assignee as the present invention. Preferably the silicon and copper are employed in the form of solid, porous contact masses consisting of a molded mixture of silicon and copper which has been fired under reducing conditions. Such contact masses and their preparation are more fully described and claimed in the copending application of Winton I. Patnode, Serial No. 412,461, filed September 26, 1941, and assigned to the same assignee as the present invention.

In order that those skilled in the art better may understand how the present invention may be carried into effect, the following illustrative examples thereof are given:

*Example I*

A stream of dry, oxygen-free nitrogen was passed through a reservoir of methylene chloride, $CH_2Cl_2$, at a rate of 300 c. c. per minute. The effluent mixture of nitrogen and methylene chloride vapors was passed into a heated tube filled with pellets of a silicon-copper contact mass containing a mixture of 9 parts silicon and 1 part copper which had been fired in hydrogen at 1050° C. for about two hours. By holding the temperature of the methylene chloride reservoir between 25° and 27° C., the methylene chloride vapor was carried into the reaction tube at the rate of about 0.8 gram per minute. The use of a nitrogen atmosphere as described herein is not part of our invention but is rather the subject matter of the copending application of M. M. Sprung and W. F. Gilliam, Serial No. 433,293, filed concurrently herewith and assigned to the same assignee as the present invention.

The reaction tube used in this and subsequent examples was about 24 inches long and 1½ inches in diameter. With the temperature of the tube and its contents held at about 300° C., approximately 80 per cent of the methylene chloride either reacted with the silicon to form a number of organosilicon compounds or condensed along with these compounds when the gaseous products passing from the exit end of the tube were condensed and collected in traps cooled by a mixture of ice and water. That portion of the methylene chloride which could not be accounted for was either swept through the condensing traps by the nitrogen flow or reacted with the silicon to form low boiling materials such as HCl, $SiH_2Cl_2$, etc., which were not completely recovered at the trap temperatures.

In addition to small quantities of low boiling chlorosilanes such as $SiH_2Cl_2$ and $SiHCl_3$, the condensate collected in the traps contained about equal parts by weight of unreacted methylene chloride and a high boiling fraction consisting principally of compounds of silicon in which the silicon atoms were linked by carbon atoms. The methylene chloride was separated by fractional distillation at atmospheric pressure, leaving a fraction boiling above 155° C. This latter fraction was carefully fractionated at a reduced pressure (10 mm.) to separate compounds identified as being $Cl_3SiCH_2SiHCl_2$, boiling point of
51.0–52.5° C. at 10 mm.
$Cl_3SiCH_2SiCl_3$, boiling point of 63.7–65.0° C.
at 10 mm. (184–5° C. at 756 mm.).
$[Cl_2SiCH_2]_3$, melting pt. 81.0–82.5° C.

Another liquid fraction was distilled over between 120° and 137° C. at 10 mm. pressure and was found to contain about 65.1 per cent chlorine. The residue boiling above 200° C. at 10 mm. pressure was a viscous, greenish-black liquid which contained 61.5 per cent chlorine and had the appearance of a high molecular weight, polymeric substance. This compound may be represented by the formula $[-SiCl_2CH_2-]_x$ where $x$ is greater than 3. Such polydichlorosilylmethylene compounds would theoretically contain 62.8 per cent chlorine.

The polymeric bodies having the formula $[Cl_2SiCH_2]_x$ specifically the compound $[Cl_2SiCH_2]_3$ which is believed to be a cyclic or closed chain compound, are more fully described and specifically claimed in our copending application Serial No. 433,330, filed concurrently herewith.

*Example II*

Using the same apparatus and procedure as in Example I, a mixture of nitrogen and ethylene dichloride in the proportions of 300 c. c. nitrogen and 0.5 gm. ethylene dichloride per minute was passed over a silicon-copper contact mass containing 90 per cent silicon and 10 per cent copper. At a temperature of 370°–380° C. approximately 70 per cent of the ethylene chloride either reacted with the silicon to form recoverable organosilicon compounds or could be recovered as such and recirculated through the reaction tube.

In addition to low boiling silicon compounds such as $SiH_2Cl_2$, $SiHCl_3$ and $SiCl_4$, the condensate collected in the traps cooled by an ice-water mixture contained a good yield of 1,2-bis(trichlorosilyl) ethane having a boiling point of 92.5°–93° C. at 24–25 mm. pressure and a melting point of 27–29° C. This compound which was liquid at temperatures slightly above room temperature crystallized in the form of long prismatic needles when the liquid material was cooled in a refrigerator.

Likewise, organosilicon compounds containing a greater number of methylene groups between the silicon atoms may be prepared by the above-described process using appropriate reactive dihalogenated hydrocarbons, e. g. trimethylene chloride, trimethylene bromide, tetramethylene chloride, etc. The desired symmetrical hydrocarbon dihalides may be reacted with the silicon without using a nitrogen atmosphere as a carrier and diluent although in most instances, particularly with the more reactive methylene and ethylene halides, better control of the reaction, less carbon formation, and better yields are obtained when the gaseous mixture entering the reaction tube contains at least 50 per cent nitrogen.

Compounds of the type described herein are useful as intermediates in the preparation of resins similar to those described, for example, in Patents 2,258,218 and 2,258,220 issued to Eugene G. Rochow. The halogen and hydrogen attached to the silicon are readily reactable. High boiling oils or plasticizers may be formed by reacting the active halogen atoms with alcohols or with Grignard reagents.

What we claim as new and desire to secure by Letters Patent of the United States is:

1. An organosilicon compound having the formula $X_3Si(CH_2)_nSiX_2Y$ where X represents a halogen atom, Y represents an atom selected from the group consisting of hydrogen and a halogen atom of the same type as that represented by X and $n$ is an integer and is at least 1 and not more than 4.

2. An organosilicon compound having the formula $X_3Si(CH_2)_nSiX_2Y$ where X represents a chlorine atom, Y represents an atom selected from the group consisting of hydrogen and chlorine, and $n$ is an integer and is at least 1 and not more than 2.

3. Trichlorosilyldichlorosilylmethane.
4. Bis(trichlorosilyl) methane.
5. 1,2-bis(trichlorosilyl) ethane.
6. The method which comprises effecting reaction between heated silicon and a hologenated hydrocarbon of the formula $X(CH_2)_nX$, wherein X is a halogen atom and $n$ is an integer and is at least 1 and not more than 4, in the presence of a metallic catalyst for said reaction.
7. The method which comprises effecting reaction between heated silicon and ethylene chloride in the presence of a copper catalyst for said reaction.
8. The method which comprises effecting reaction between heated silicon and a chlorinated compound of the formula $Cl(CH)_nCl$, wherein $n$ is an integer and is at least 1 and not more than 2, in the presence of a copper catalyst for said reaction, said reaction being carried out at a temperature of at least 280° C. in the presence of nitrogen.

WINTON I. PATNODE.
ROBERT W. SCHIESSLER.